United States Patent
Jankowski et al.

[15] 3,705,646
[45] Dec. 12, 1972

[54] CARTRIDGE FOR FIXING ANCHOR ELEMENTS IN HOLES OF A SUPPORT STRUCTURE

[72] Inventors: Alfons Jankowski, Essen; Fritz Schuermann, Winz/Niederwenigern, both of Germany

[73] Assignee: Bergwerksverband GmbH, Essen, Germany

[22] Filed: Jan. 5, 1971

[21] Appl. No.: 103,359

[30] Foreign Application Priority Data

Jan. 8, 1970 Belgium..................................83659

[52] U.S. Cl. ..............................206/47 A, 206/56 AA
[51] Int. Cl. ...........................................B65d 79/00
[58] Field of Search ........................206/47 A, 56 AA

[56] References Cited

UNITED STATES PATENTS 3,324,663   6/1967   McLean..........................206/47 A X Primary Examiner—Allen N. Knowles
Assistant Examiner—Gene A. Church
Attorney—Michael S. Striker

[57] ABSTRACT

A tubular plastic foil bag is adapted for insertion into a hole provided in a support structure and has an inner side, an outer side, and spaced ends. Clamps or similar means closes the spaced ends and the bag contains a mixture of filler material and a hardenable resin. A closed frangible vial, of glass or the like, accommodates a hardener which will harden the resin when it becomes admixed therewith. The vial extends along the bag and is located either in the interior embedded in the mixture, or is secured to the exterior of the bag. When the cartridge is inserted into a support structure and subsequently the bag is ruptured and the vial is broken, the hardener and the mixture can admix and the resin will harden.

9 Claims, 2 Drawing Figures

PATENTED DEC 12 1972

3,705,646

INVENTOR
ALFONS JANKOWSKI
BY FRITZ SCHWEDHAL

ATTORNEY

3,705,646

CARTRIDGE FOR FIXING ANCHOR ELEMENTS IN HOLES OF A SUPPORT STRUCTURE

BACKGROUND OF THE INVENTION

The present invention relates generally to fixing means for fixing anchor elements in holes of a support structure, and more particularly to a cartridge for fixing such anchor elements.

U. S. Pat. Re No. 25,869 to F. Schuermann et al and Belgian Pat. No. 589,831 disclose a method of fixing anchor bolts in drill holes in a support structure. This method was first publicly discussed between May 16 and 20, 1960 in Paris during the "Conference Internationale sur les Pression de Terrains," at which time it was indicated that the anchoring was to be effected by inserting a cartridge into a drill hole or bore hole, with the cartridge being breakable and accommodating a resin admixed with a filler and, separately contained, a hardener admixed with gypsum or the like. Thereupon an anchoring bolt or rod is inserted into the bore hole and such pressure is exerted upon the cartridge as to break the same, for instance by pushing and also turning the rod; then the hardener can become admixed with the resin, causing the latter to harden and to anchor the anchor bolt or anchoring rod in the hole. The diameter of the anchor bolt is so selected that the bolt is freely movable in the hole so that it can be inserted into the latter with considerable force for impingement upon the cartridge to assure that the cartridge can be readily broken. Once the hardener in combination with the resin has caused the resin and the filler material admixed therewith to harden, the anchoring bolt—which is left in the hole after it is used to rupture the cartridge and to mix the components together—is anchored extremely strongly in the hole.

Subsequent to this disclosure various different types of cartridges became commercially available. One of these, available in France, has an outer bag of plastic foil which accommodates in its interior a rod of compressed sand, that is a member composed of sand which is so compressed as to remain in rod form, which rod is surrounded by a hardener and mixture of a filler and a resin; the hardener may be benzoylperoxide, which can also be used in other cartridges of this type. At the interface between the sand rod and the resin and filler mixture there develops in this prior art construction a separating layer due to polymerization of the resin which directly surrounds the sand rod, so that in this case also the hardener and the resin are maintained separately. It was found, however, that this particular type of prior-art construction has a relatively short shelf life because a progressing of the polymerization of the resin under the influence of the hardener—in direction outwardly from the sand rod—can never be precluded. The advantages of this particular construction are given as a more ready admixture of resin and hardener. However, if one considers that an anchoring bolt or anchoring rod which is used in conjunction with such cartridges almost invariably weighs several pounds and is inserted into the bore hole freely movable and with considerable force, then it is clear that this advantage does not in fact exist because the force of the rod as it is inserted will in any case be sufficient to shatter the cartridge and to effect the desired admixture. What remains, therefore, in this particular prior-art construction is the disadvantage that it has a comparatively short shelf life. In addition, the cartridge—utilizing a foil bag for its outer skin—is insufficiently stiff and cannot therefore be easily inserted into a bore hole. This problem was attempted to be overcome by providing an outer sheath of rigid plastic which evidently increases the expenses involved, not to mention that fact that even the outer sheath is relatively readily breakable so that it is difficult to store and transport this cartridge without substantial losses due to breakage.

SUMMARY OF THE INVENTION

It is, accordingly, an object of the invention to overcome the aforementioned disadvantages.

More particularly it is an object of the invention to provide an improved cartridge of the general type under discussion which is not possessed of such disadvantages.

A concomitant object of the invention is to provide such an improved cartridge in which the admixture of the resin and hardener is facilitated and which can be readily inserted into a bore hole or the like.

In pursuance of the above objects, and others which will become apparent hereafter, one feature of the invention resides in a cartridge for fixing anchor elements in holes of a support structure, which briefly stated comprises a tubular plastic foil bag adapted for insertion into a hole provided in a support structure and having an inner side, an outer side, and spaced ends. Closure means closes the spaced ends and a mixture of filler material and of a hardenable resin is accommodated in the bag. A closed frangible vial accommodates a hardener for hardening the resin upon admixture with the same, and this vial extends along and is fast with the aforementioned bag and one of the sides thereof.

Thus, the advantage of readily rupturing the outer skin—here the plastic foil bag—is present in the cartridge according to the present invention. Accommodating the hardener in a closed frangible vial, however, has more than one advantage. Firstly, the presence of the vial imparts to the foil bag a certain longitudinal stiffness so that it can more readily be inserted into a bore hole. On the other hand when the frangible vial—usually glass—is broken upon insertion of an anchoring bolt or rod into the bore hole accommodating the cartridge, the many small fragments into which it splinters and which have sharp edges, serve in shredding the foil of the plastic bag so that the admixture can take place more readily and more quickly. As a result, the plastic foil bag may have a wall thickness which is relatively substantial, that is between 0.02 and 0.1 mm so that it may even be filled with a certain internal pressure which further improves its longitudinal stiffness and consequently the ease of insertion into a bore hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
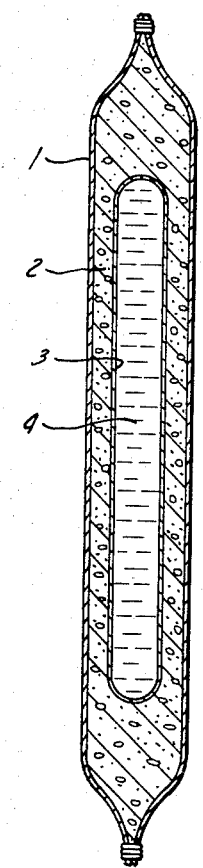
FIG. 1 is a longitudinal section illustrating one embodiment of the invention.
Figure 2:
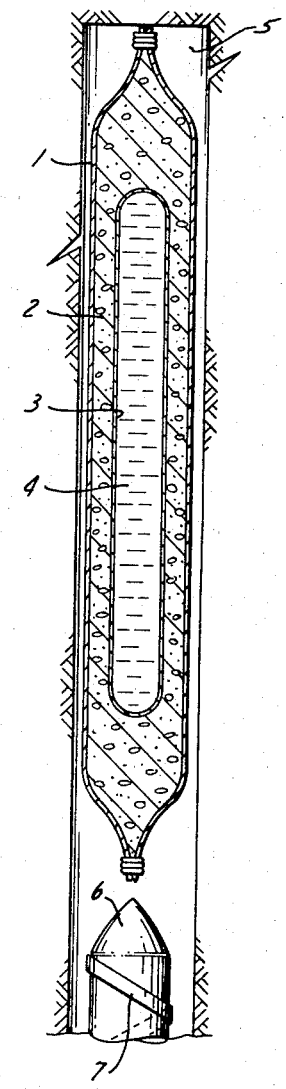
FIG. 2 is a section illustrating the embodiment of FIG. 1 accommodated in a bore hole.

Discussing now the drawing in detail it will be seen that in FIGS. 1 and 2 we have illustrated a cartridge according to the present invention. It has a tubular plastic foil bag 1 whose wall thickness may, as pointed out above, be between 0.02 and 0.1 mm. Various different plastic materials are suitable for this purpose and are well enough known to those skilled in the art not to require detailed discussion. Accommodated in the foil bag 1 is a mixture 2 of a hardenable synthetic resin and a filler material such as quartz sand or the like. In the illustrated embodiment there is embedded in this mixture 2 an elongated closed frangible vial 3 of glass which defines a first compartment accommodating a hardener for hardening the resin of the mixture 1 when it becomes admixed therewith. In addition to the hardener the vial 3 accommodates another filler material, such as gypsum or the like, and the mixture accommodated in the vial 3 is designated in toto with reference numeral 4. The foil bag 1 surrounds the vial 3 and defines therewith a second compartment which, as just mentioned, is filled with a mixture of resin and hardenable material.

The opposite ends of the foil bag 1 are ordinarily open, that is before it is filled with its contents, and are closed by means of clamps, wire windings, clips or similar elements which are illustrated but not separately identified with a reference numeral.

In FIG. 2 we have illustrated a bore hole 5 in a support structure, with the cartridge being accommodated in the bore hole. Once this is done, an anchoring bolt or rod is introduced into the bore hole with lateral play and at considerable force so as to impinge with its leading end portion 6 upon the bag 1 whereby the latter will be ruptured, with subsequent breaking of the vial 3. Advantageously the rod is provided with a peripheral rib 7 so that, when the bag 1 and vial 3 have been broken, the rod can be turned with the rib 7 facilitating admixture of the hardener and gypsum combination 4 with the sand and resin combination 2. The frangible glass vial 3 will break into sharp shards upon use of the cartridge. The plastic foil bag 3 is formed of a plastic material shreddable upon repeated forcible contact with the sharp shards resulting from breakage of vial 3 upon use of the cartridge, and upon driving in of the anchoring element.

The present invention is not restricted to having the vial 3 located on the inner side of the bag 1, but instead it could also be located at the outer side, suitably connected therewith. In the latter case the vial is of course not protected against breaking by the mixture 2. On the other hand, even if breakage should occur while the vial is embedded in the mixture 2, this is of relatively little consequence because it would result only in local polymerization of the resin and not in a complete hardening of the contents of the bag 1.

It is clear that the present invention is usable with resins which harden quickly as well as with resins which harden slowly. Also, the configuration of the bag 1 could be different from what has been illustrated. For instance, the bag 1 could be provided with a definite head or leading end portion which is introduced first into the bore hole and which itself accommodates a substantial quantity of the mixture 2 and one or several of the vials 3 with their contents. Cartridges constructed in this manner aim to obtain a rapid bonding of the leading end portion of the anchoring rod within the depths of the bore hole 5 so that the anchoring rod is quite rapidly anchored in place, whereas the remaining potion of the anchoring rod closer to the open end of the bore hole 5 will be bonded in place only latter, for instance by other cartridges which have been simultaneously introduced into the bore hole 5 but which utilize a slower-hardening resin. With such a construction a large portion or the entire portion of the anchoring rod accommodated in the bore hole can be protected against corrosion.

Because of the force with which the anchoring rod can be and is introduced into the bore hole the vial may have a relatively substantial wall thickness without adversely influencing the ease with which it can be broken. Thus, the wall thickness of the vial may be on the order of 0.2–1.0 mm. Of course, the cartridge according to the present invention can also be provided if desired with an exterior sleeve of plastic or the like, but this should not be ordinarily necessary.

By way of example it is pointed out that a cartridge according to the present invention was produced by utilizing a polyamide foil bag having a wall thickness of 0.05 mm, a length of 50 cm and a diameter of 28 mm. This was filled with a mixture of 5 parts rock flour to 1 part of polyester resin. Inserted into this mixture was a glass vial of 5 mm outer diameter, 4 mm inner diameter and 40 cm length accommodating a mixture of gypsum and benzoylperoxide as a hardener. The opposite ends of the foil bag were clamped shut with clips or the like.

Three of these cartridges were inserted into a bore hole having a diameter of between 24 and 30 mm and subsequently an anchoring rod having a diameter of between 16 and 24 mm was rammed into the bore hole and also turned therein, thereby destroying the foil bags and the vials of the three cartridges and causing the contents to become admixed. After hardening of the resin involved the bore hole was cut open and it was determined on closer examination that the foil of the bags of the three cartridges had been shredded into small pieces and that the admixture of resin and hardener had been complete.

It will be understood that each of the elements described above, or two or more together, may also find a useful application in other types of constructions differing from the types described above.

While the invention has been illustrated and described as embodied in a cartridge for fixing anchor elements in holes of support structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A cartridge for fixing anchor elements in holes of a support structure, comprising a frangible vial means breakable into sharp shards upon use of said cartridge and defining when unbroken a first compartment; a closed tubular plastic foil bag surrounding said frangible vial and defining therewith a second compartment, and being formed of a plastic material shreddable upon forcible contact with the sharp shards resulting from breakage of said frangible vial means; hardenable resin accommodated in one of said compartments; and a hardener for hardening said resin upon admixture with the same and being accommodated in the other of said compartments, whereby, when said cartridge is positioned in a hole and an anchoring element is thereupon forcibly driven into such hole, the anchoring element will break said frangible vial into sharp shards which will shred said plastic foil bag as the anchoring element advances in such hole.

2. A cartridge as defined in claim 1, wherein said vial means consists of glass.

3. A cartridge as defined in claim 1, wherein said vial is at least substantially longitudinally coextensive with said bag.

4. A cartridge as defined in claim 1, wherein said plastic foil bag has a wall thickness of between 0.02 and 0.1 mm.

5. A cartridge as defined in claim 1, wherein said vial means has a wall thickness of between 0.2 and 1 mm.

6. A cartridge as defined in claim 1, wherein said bag has an inner side, and wherein said vial means is fast with said inner side.

7. A cartridge as defined in claim 1, wherein said mixture is accommodated in said second compartment, and wherein said frangible vial means is embedded in and supported by said mixture.

8. A cartridge as defined in claim 1, wherein said mixture is accommodated in said second compartment.

9. A cartridge as defined in claim 1, wherein said mixture is accommodated in said second compartment substantially completely filling the same and imparting shape-retaining characteristics to the same and thereby to said cartridge.

* * * * *